UNITED STATES PATENT OFFICE.

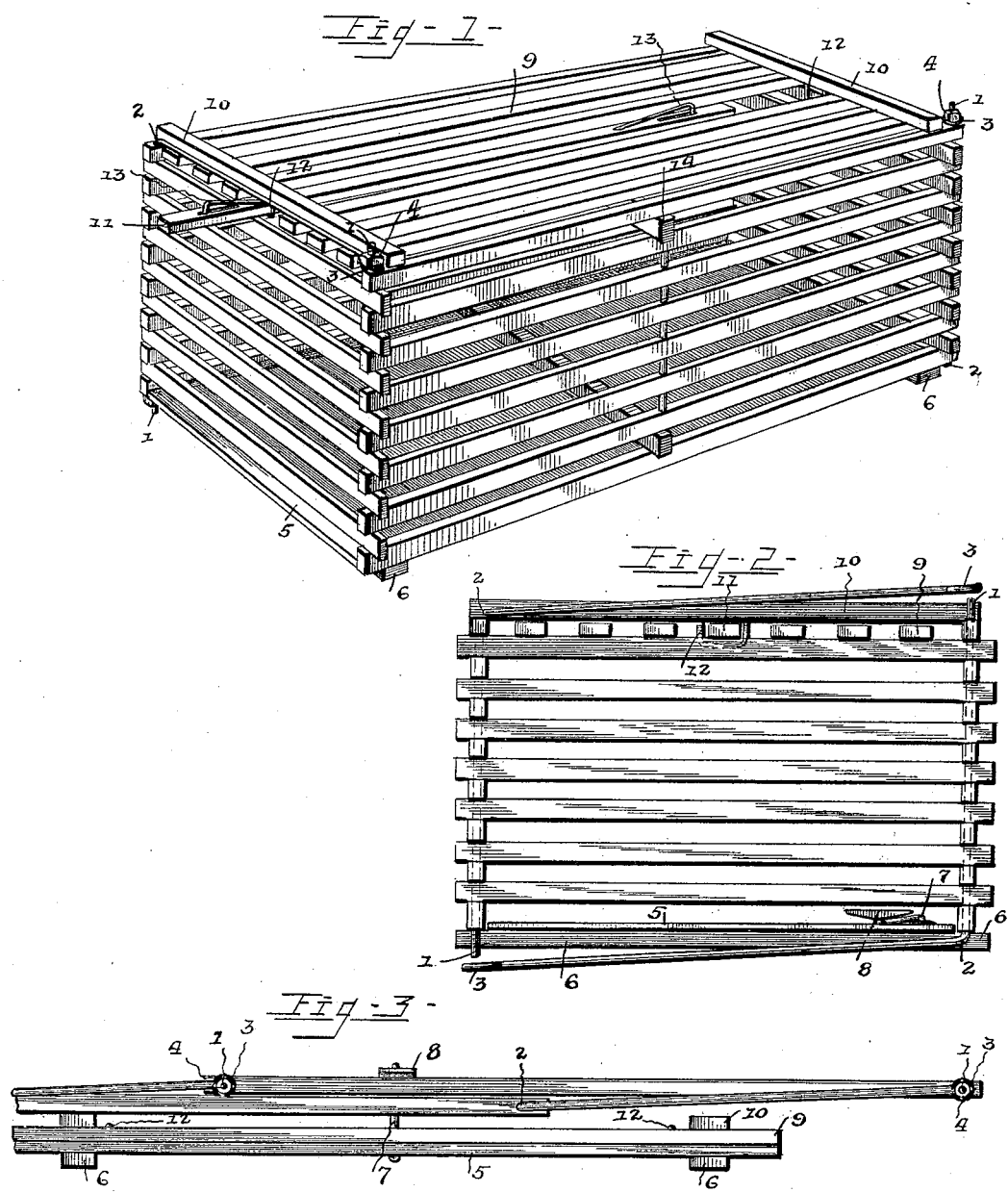

FRANK P. MURPHEY, OF CHICAGO, ILLINOIS, ASSIGNOR OF ONE-HALF TO ROBERT G. GREEN, OF SAME PLACE.

FOLDING CRATE.

SPECIFICATION forming part of Letters Patent No. 607,121, dated July 12, 1898.

Application filed December 3, 1897. Serial No. 660,625. (No model.)

*To all whom it may concern:*

Be it known that I, FRANK P. MURPHEY, a citizen of the United States, residing at Chicago, in the county of Cook and State of Illinois, have invented a new and useful Folding Crate, of which the following is a specification.

This invention relates to crates particularly designed for poultry, but which may be used for shipping fruit and like articles and which can be easily reduced to a small compass for economizing space for storing or transportation. The crate is of the type formed of a number of bars or strips having their end portions overlapping and pivotally connected by rods or bolts and which are reduced to a knockdown condition by removing the top and bottom and pressing the sides together from diagonally opposite points, whereby corresponding parts are folded the one upon the other.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view showing the crate as it will appear when set up for use, the intermediate bar of the top being moved aside to admit of access to the interior of the crate. Fig. 2 is an end view showing the bent ends of the rods released preparatory to removing the top and bottom prior to collapsing the body portion of the crate. Fig. 3 is a detail view showing the crate in a knockdown form.

Corresponding and like parts are referred to in the following description and indicated in the several views of the drawings by the same reference characters.

The sides and ends of the body are composed of bars or strips having their end portions overlapping and pivotally connected by a rod or stout wire passing through registering openings in the overlapping ends. The rods or wires project at one end, as shown at 1, and their opposite end portions are bent about at right angles, as shown at 2, and terminate in eyes 3 to receive the projecting ends 1, which latter are retained in place by nuts 4, screwed upon the parts 1, which are threaded for this purpose. The bent ends 2 of the wires or rods project across the end pieces of the crate and confine the end portions of the top and bottom, respectively. When it is required to remove the top or bottom or place the same in position, the eyed ends 3 are disengaged from the projecting ends 1, and the bent portions 2 are turned aside sufficiently far to admit of the parts being detached.

The bottom 5 is solid and is strengthened by cleats 6, secured transversely thereof near its ends, and which cleats engage with the lower bent portions 2 of the rods or wires, so as to prevent longitudinal displacement of the bottom when in position. A wire 7 or like connection is secured to the top side of the bottom near one edge and is provided with a turn-button 8, by means of which the component parts of the crate are held together when reduced to a knockdown condition.

The top 9 is formed of bars or slats, which are secured to transverse cleats 10, and which cleats engage with the upper bent portions 2 of the rods or wires, so as to hold the top in place. An intermediate bar, as 11, is loose and adapted to be moved to admit of access being had to the interior of the crate for any desired purpose, and when the crate is used as a coop for poultry the latter can be removed from the coop or placed in position by moving the bar 11 longitudinally, as indicated most clearly in Fig. 1. Staples or keepers 12 are pendent from the cleats 10 and receive the end portions of the bar 11, which is slidably mounted therein. Spring-catches 13 are applied to the top side of the bar 11 near its ends and engage with the inner side of the cleats 10, so as to retain the bar 11 in place under normal conditions. When it is required to gain access to the interior of the crate, one or the other of the spring-catches 13 is depressed and the bar 11 is moved longitudinally, thereby forming an end opening through which the interior of the crate can be reached.

Transverse bars 14 are located between the ends of the crate and have pivotal connection with the side bars thereof by means of vertically-disposed rods or wires, and these bars serve to strengthen and stiffen the crate, and if provided in sufficient number will serve to subdivide it into compartments, as will be readily understood.

Having thus described the invention, what is claimed as new is—

1. In a folding or knockdown crate, the combination with the sides and ends composed of bars having their end portions overlapping, of rods or wires passing through registering openings in the overlapping ends of the bars and having opposite ends projecting, and having the other end portions bent to extend about parallel with the end pieces, and constructed to make detachable connection with the projecting end portions of the said rods, substantially as shown for the purpose set forth.

2. In a folding or knockdown crate, the combination with the sides and ends of the body composed of bars having their end portions overlapping, of rods or wires passing through corresponding openings in the overlapping ends of the bars and having their diagonally oppositely disposed end portions projecting, and having the opposite end portions bent to extend about parallel with the ends of the crate and terminating in eyes to receive and make detachable connection with the aforesaid projecting ends of the rods, substantially as set forth.

3. In a folding or knockdown crate, the combination with the sides and ends composed of bars having their end portions overlapping, of rods passing through openings in the overlapping ends and having the diagonally-disposed end portions projecting and threaded, and having the opposite end portions bent to project across the top and bottom of the crate and terminating in eyes to receive the said threaded ends, and nuts mounted upon the threaded ends to retain the parts in position, substantially as set forth.

In testimony that I claim the foregoing as my own I have hereto affixed my signature in the presence of two witnesses.

FRANK P. MURPHEY.

Witnesses:
H. T. RICHARDS,
B. H. MERRILL.